United States Patent [19]

Lucas

[11] Patent Number: 4,629,658
[45] Date of Patent: Dec. 16, 1986

[54] POLYOLEFIN COMPOSITIONS AND LAMINATED ARTICLE

[75] Inventor: Bennie M. Lucas, Odessa, Tex.

[73] Assignee: El Paso Products Company, Odessa, Tex.

[21] Appl. No.: 871,239

[22] Filed: Jun. 6, 1986

Related U.S. Application Data

[62] Division of Ser. No. 812,582, Dec. 23, 1985.

[51] Int. Cl.$^4$ .................. B32B 27/08; B32B 27/06; B32B 25/18; B32B 25/00
[52] U.S. Cl. .................. 428/520; 428/516; 428/35
[58] Field of Search .................. 428/520

[56] References Cited

U.S. PATENT DOCUMENTS

| | | | |
|---|---|---|---|
| 3,361,852 | 1/1968 | Bassett et al. | 525/222 |
| 3,389,016 | 6/1968 | Holtz et al. | 525/222 |
| 3,433,573 | 3/1969 | Holladay et al. | 525/222 |
| 3,600,347 | 8/1971 | Codar | 525/210 |
| 3,896,069 | 7/1975 | Kosaka et al. | 525/222 |
| 4,041,002 | 8/1977 | Aboshi et al. | 525/222 |
| 4,045,515 | 8/1977 | Isaka et al. | 525/222 |
| 4,222,913 | 9/1980 | Cooper | 525/222 |
| 4,299,930 | 11/1981 | Boggs | 525/222 |
| 4,358,557 | 11/1982 | Boggs | 525/210 |
| 4,359,495 | 11/1982 | Schroeder | 428/35 |
| 4,387,185 | 6/1983 | Schroeder et al. | 525/222 |
| 4,401,536 | 8/1983 | Lundell et al. | 525/222 |
| 4,599,276 | 7/1986 | Martini | 428/520 |

Primary Examiner—Carman J. Seccuro
Attorney, Agent, or Firm—Fred S. Valles; Margareta Le Maire

[57] ABSTRACT

Blends of propylene polymer, ethylene-vinyl acetate copolymer and optionally a synthetic rubber, with small amounts of a polyterpene resin as a compatabilizer, possess excellent properties for the manufacture of heat-sealable and sterilizable films as well as for the manufacture of molded speciality sealed containers and bottles.

4 Claims, No Drawings

POLYOLEFIN COMPOSITIONS AND LAMINATED ARTICLE

This is a division of application Ser. No. 812,582, filed Dec. 23, 1985.

FIELD OF THE INVENTION

The present invention relates to novel polyolefin compositions having remarkable strength and toughness properties, and in particular to blends of a propylene polymer, an ethylene-vinyl acetate polymer, a specific compatabilizer and a synthetic rubber as an optional component.

One aspect of the invention relates to resin compositions useful e.g. in the manufacture of strong and flexible parenteral solution bag films which are heat sealable and sterilizable.

A further aspect relates to resin compositions suitable for the manufacture of squeeze bottles and containers.

Still another aspect relates to compositions which have a high tear resistance and are useful e.g. in the manufacture of containers and of seals for so-called "tear tab" containers. Other aspects of the invention relate to monolayer and coextruded films suitable for manufacture of IV bags.

BACKGROUND OF THE INVENTION

Parenteral solutions broadly cover fluid replacement, electrolyte replacement and are vehicles for drug medication. Solutions include blood plasma, platelets, red cells, kidney dialysis solutions, saline solutions and nutritional products. These solutions were initially bottled in glass, however, with the introduction of the collapsible parenteral solution bag some years ago, airborne contamination was significantly reduced since the flexible bags empty without outside air entering the system.

The general requirements of a resin used in the manufacture of the parenteral solution bags include flexibility, clarity, toughness at low temperatures, heat-sealability, good processability, moisture vapor permeability resistance and ability to be sterilized. The industry is presently employing a highly plasticized PVC film for this purpose. Although this resin does meet most of the requirements, a material is preferred that has little or no plasticizer. Also, the PVC film is not very resistant to moisture vapor permeability, and consequently, the continuing loss of moisture of the parenteral solutions reduces their storage life considerably. Therefore, it is required that the bag be sealed within an overpouch made from a film resin designed to have a low water vapor transmission rate (WVTR).

In the manufacture of molded specialty bottles and containers, many of the above-mentioned properties are also desired although other properties might need to be different e.g. the degree of stiffness might be varied from one application to another.

It is therefore an object of the present invention to provide a resin composition which is adapted for processing into heat-sterilizable, flexible films.

It is another object of the invention to provide a resin composition adaptable for the manufacture of flexible containers.

It is a further object to provide a composition useful in the manufacture of tear tab bottles.

It is an object of the present invention to provide a film useful in the manufacture of sterilizable, collapsible bags for direct and for indirect containment of parenteral solutions.

THE INVENTION

In accordance with the present invention there is provided polymer composition comprosed of:
(a) from about 10 to about 98 wt % of a propylene polymer;
(b) from about 1 to about 50 wt % of an ethylene vinyl acetate copolymer;
(c) from about 0 to about 50 wt % of a synthetic rubber, and
(d) from about 0.005 to about 1.5 wt % based on the total weight of (a), (b) and (c) of a polyterpene resin.

The propylene polymer resin component can be a propylene homopolymer, a random copolymer of propylene and ethylene containing from about 0.5 to about 6 wt % polymerized ethylene and preferably from about 1 to about 5 wt % of polymerized ethylene, or a mixture of the homopolymer and copolymer.

The ethylene-vinyl acetate copolymer should be a high molecular weight resin containing from about 3 to about 25 wt % polymerized vinyl acetate groups preferably between about 4 and about 12 wt %.

The synthetic rubber component, if present, is suitably selected from butyl rubber, polybutadiene, polyisobutene, styrene-butadiene rubber, ethylene-propylene rubber, EPDM, etc.

The polyterpene resin compatabilizer is a thermoplastic polymer produced by the polymerization of terpene hydrocarbons consisting primarily of either beta-pinene and dipentene. These resins are commercially available and have heretofore been used as tackifiers and adhesive promoters.

For heat sterilizable film applications the preferred composition is a blend comprising:
(a) from about 10 to about 50 wt % of the propylene polymer;
(b) from about 10 to about 60 wt % of the ethylene-vinyl acetate copolymer;
(c) from about 10 to about 60 wt % of the synthetic rubber, and
(d) from about 0.01 to about 1.5 wt % based on the total weight of (a), (b) and (c) of the polyterpene resin.

The most preferred ranges for the four components are respectively:
(a) from about 15 to about 35 wt %;
(b) from about 30 to about 50 wt %;
(c) from about 30 to about 50 wt %, and
(d) from about 0.1 to about 1 wt %.

One optional component of the resin blend is an agent added in a quantity effective to produce films of improved clarity. Examples of suitable agents are sodium benzoate, dibenzylidene sorbitol, sorbitan monooleate and others. Usually the agents are added in quantities between about 0.1 and about 2 wt % based on the total weight of components (a) through (c).

The blend composition of the present invention is easily processable into blown or cast film products which, in addition to high clarity, exhibit other desirable properties such as flexibility, toughness at low temperatures, heat-sealability. Also, the films have good resistance to moisture vapor permeability and can be steam sterilized at 121° C. without significantly affecting its physical properties in a detrimental way. Finally, the films contain no additives, which would prevent their use in food or medical applications, either in direct or indirect contact.

The film should have a thickness usually in the range from about 3 to about 10 mils for the manufacture of collapsible, flexible parenteral solution bags.

In order to improve the read-through clarity of the film prepared from the above resin blend, it is sometimes preferable to coextrude the resin with a propylene polymer, such as the propylene polymer component (a) of the present invention to produce a composite film of at least two layers. A three-layered film structure with propylene polymer outer layers is within the scope of the invention. For best heat-sealability it is preferred that a two-layered composite be employed in the manufacture of IV bags with the propylene polymer as the outside film layers.

The same resin blend is also useful in the manufacture of flexible containers such as squeeze bottles or tubes. The bottles or tubes can be injection molded or blow molded using any conventional techniques and can be used for containment and dispersion a variety of viscous materials such as salves, ointments and lotions. Foods and condiments are also packaged with advantage in the squeeze containers.

Another embodiment of the present invention relates to resins useful in the manufacture of more rigid bottles and containers having improved tear resistance. Specifically, these resins are particularly desirable for the manufacture of tear tab containers. i.e. containers which are formed, filled and sealed in one manufacturing operation. The seals of the filled containers are broken by manual pulling on the tear tab thereby releasing the container top from the container. It is of real importance that there should be no failures such as breaking, splitting, etc. of the tear tab during the opening of the container.

The preferred resin composition of improved tear resistance is comprised of:

(a) from about 90 to about 99 wt % of the propylene polymer;
(b) from about 1 to about 10 wt % of the ethylene-vinyl acetate copolymer;
(c) from about 0 to about 9 wt % of the synthetic rubber; and
(d) from about 0.005 to about 1.5 wt % based on the total weight of (a), (b) and (c) of the polyterpene resin.

The most preferred ranges for the four components are respectively:

(a) from about 92 to about 98 wt %;
(b) from about 1.5 to about 7 wt %;
(c) from about 1.5 to about 7 wt %; and
(d) from about 0.01 to about 1.0 wt %.

The present invention is further described in more detail by way of examples, which are provided for illustration, but it is not intended to be limited thereby.

EXAMPLE 1

A blend was prepared of 40 pounds Polysar butyl rubber XC 961, 40 pounds of and ethylene/vinyl acetate copolymer (containing about 9.0 wt % vinyl acetate groups), 20 pounds of a random copolymer of propylene and ethylene (containing about 2.3 wt % ethylene groups) and 0.5 pounds of Zonarez 7115, a polyterpene resin based primarily on dipentene. The blend was used in preparing a blown film of 7 mil thickness. It had excellent toughness, was easily heat-sealable and was flexible. Pouches made from these films were filled with water, heat-sealed and tossed in the air to simulate a 10 foot drop. All pouches survived at least 6 drops at ambient temperature.

EXAMPLE 2

The resin blend of Example 1 was coextruded with the random propylene/ethylene copolymer component into an 8 mil three-layered film composite with the random copolymer as the outside layers.

Table 1 lists the physical properties of the film which also had excellent see-through properties.

TABLE 1

|  | Machine Direction | Transverse Direction |
|---|---|---|
| Tensile @ Yield, psi | 1230 | 790 |
| Tensile @ Break, psi | 2570 | 1330 |
| Elongation @ Break, % | 600 | 570 |
| 1% Secant Modulus, psi | 20600 | 12100 |
| Dart Drop (Method A), gms | >1600[1] | |
| Haze, % | 25.0 | |
| Gloss @ 60°, % | 44 | |
| Yellowness Index (Transmission) | 1.5 | |

[1]No breaks were obtained at maximum weight.

EXAMPLES 3-5

Three resin blends suitable for tear tab bottle production were prepared from the components of Example 1 in the proportions listed in Table 2, which also shows the results of test performed on the compositions.

TABLE 2

| Example | 3 | 4 | 5 |
|---|---|---|---|
| Propylene Random Copolymer - lbs | 95.0 | 96.87 | 93.75 |
| Ethylene/Vinyl Acetate - lbs | 4.5 | 1.56 | 3.12 |
| Butyl Rubber - lbs | — | 1.56 | 3.12 |
| Polyterpene - lbs | 0.5 | 0.015 | 0.03 |
| Flexural Modulus, kpsi | 125 | 129 | 127 |
| Tensile @ Yield, psi | 3770 | 3870 | 3700 |
| Tensile @ Break, psi | — | — | — |
| Elongation @ Break, % | >700 | >700 | >700 |
| HDT @ 66 psi, °C. | 85 | 87 | 86 |
| Izod, ft-lbs/in | 2.2 | 1.8 | 2.3 |
| Panel Tear Test (ASTM-D 1938) | | | |
| Panel Thickness, range in inches | 0.024–0.032 | 0.024–0.032 | 0.022–0.030 |
| Initial force - lbs | 3.4 | 3.6 | 3.2 |
| Maximum Force - lbs | 17.0 | 20.5 | 18.0 |

No failures were observed in tests opening sealed bottles by pulling the tear tabs.

It is to be understood that many modifications and alterations can be made to this invention without departing from its scope, which is defined by the specification and appended claims.

What is claimed is:

1. A composite film comprising a first layer produced from a resin comprised of:
   (a) from about 10 to about 50 wt % of a propylene polymer selected from the group consisting of propylene homopolymer, a random copolymer of propylene and ethylene containing from about 0.5 to about 6 wt % polymerized ethylene, or a mixture of said homopolymer or copolymer;
   (b) from about 10 to about 60 wt % of an ethylene-vinyl acetate copolymer;
   (c) from about 10 to about 60 wt % of a synthetic rubber; and (d) from about 0.01 to about 1.5 wt % based on the total weight of (a), (b) and (c) of a polyterpene resin, and a second layer conextruded with the first layer and comprised of the propylene polymer of component (a).

2. The composite film of claim 1 wherein component (a) ranges from about 15 to about 35 wt %; component (b) from about 30 to about 50 wt %; component (c) from about 30 to about 50 wt % and component (d) from about 0.1 to about 1 wt %.

3. The composite film of claim 2 further comprising a third layer of the resin of component (a) coextruded with the first and second layers and positioned to enclose the first layer between said second and third layers.

4. The composite film of claim 1 further comprising a third layer of the resin of component (a) coextruded with the first and second layers and positioned to enclose the first layer between said second and third layers.

* * * * *